G. S. GUNDERSEN.
AUTOMOBILE AXLE.
APPLICATION FILED JULY 15, 1911.

1,051,995.

Patented Feb. 4, 1913.
2 SHEETS—SHEET 2.

Inventor
Gilbert S. Gundersen.

Witnesses

By R. J. McCarty
his Attorney

UNITED STATES PATENT OFFICE.

GILBERT S. GUNDERSEN, OF DAYTON, OHIO, ASSIGNOR OF ONE-HALF TO GEORGE M. SMART, G. RUSSELL WELLS, ANDREW E. AUSMAN, AND OTTO KOLB, ALL OF DAYTON, OHIO, AND FRANK A. TRANCHANT, OF OSBORN, OHIO.

AUTOMOBILE-AXLE.

1,051,995.     Specification of Letters Patent.     Patented Feb. 4, 1913.

Application filed July 15, 1911. Serial No. 638,616.

*To all whom it may concern:*

Be it known that I, GILBERT S. GUNDERSEN, a citizen of the United States, residing at Dayton, in the county of Montgomery and State of Ohio, have invented certain new and useful Improvements in Automobile-Axles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the driving axles of automobiles.

The object of the invention, briefly, is to provide means whereby the jack shaft, which is the main driving shaft, is relieved of excessive torsional strain.

As is well understood, the axle spindles of a vehicle are required to be in a lower plane than that of the axle from which they extend, it is therefore another object of my invention to provide means for driving the wheels supported on such spindles included in the running gear of an automobile. The means briefly consist in freeing the wheels from any connection with the driving gears and jack shaft.

A further object of the invention is to provide means whereby a given power is capable of exerting a greater initial force in moving a load.

Preceding a fuller description of the invention, reference is made to the accompanying drawings, of which—

Figure 1:
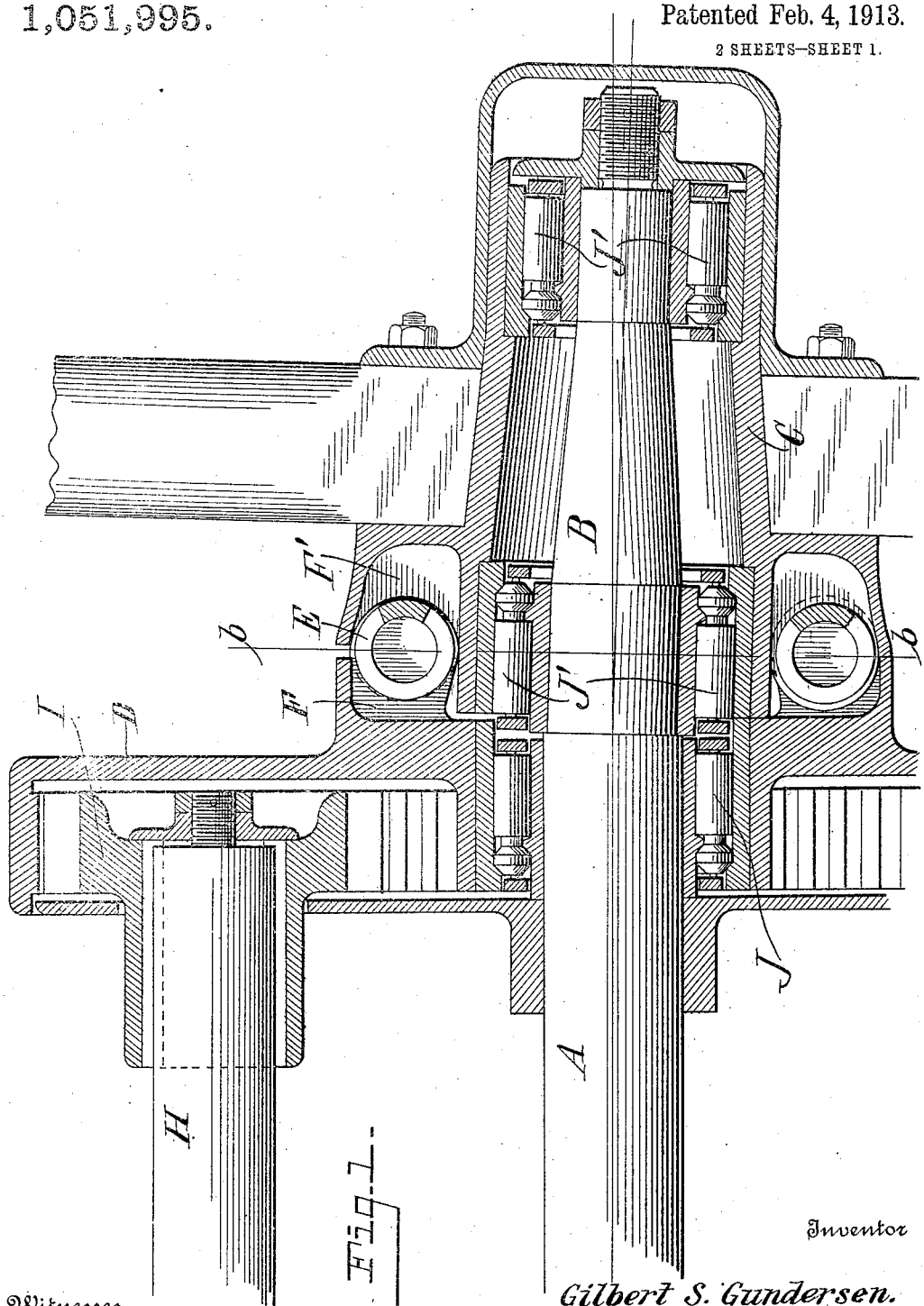
Figure 2:
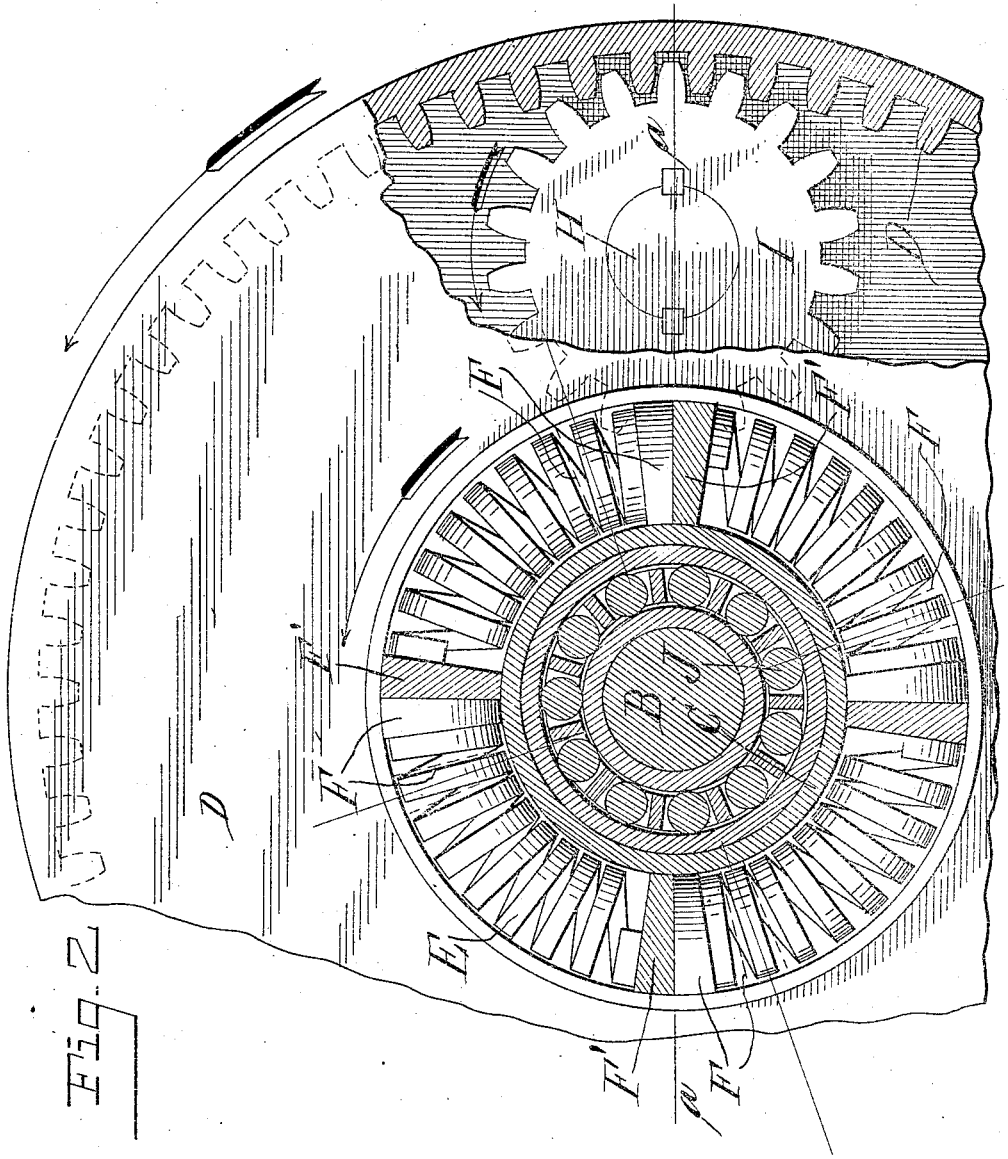

Figure 1 is a sectional view on the line *a—a* of Fig. 2, showing the bearings at one end of the axle, parts of the wheel, axle and jack shaft being omitted. Fig. 2 is a sectional view on line *b—b* of Fig. 1.

In a more detailed description of the invention, similar reference characters indicate corresponding parts.

A description of the bearings and parts of one of the spindles will serve to make clear both, as they are identical one with the other. The driving shaft or axle A supports at each end a drive gear D of the internal tooth variety, which runs loose on roller bearings J. Engaging these gears at each end of a jack shaft H, is a pinion I. On the outer face *b* of each of said gears E is a series of lugs F. The spindle B at each end of the axle drops below the plane of the axle so that the wheels may properly engage the ground. The wheel hubs C are supported on said spindles through inner and outer roller bearings J'. Projecting from the inner end of each of said wheel hubs are a series of lugs F' corresponding in number to the lugs F on the driving gear. Placed between each pair of lugs F and F' is a convolute spring E, there being in the present case four of such springs arranged around the hub C and between said hub and the gear D. During the operation of the vehicle, the spindles B are subject to flex, due to the load carried by the vehicle and the shock received by the wheel when passing over uneven surfaces. The lugs F—F' form a universal connection which permits the axis of the wheel to move relatively to the axis of the axle and the hub C of the wheel to move laterally, relative to the gear D. The friction due to the wheels engaging the ground retards their movement. The gearing D moving under the power transmitted thereto from the jack shaft, will cause the springs to compress, the extent of compression being indicated by the dotted position of said springs in Fig. 2. At this time the power behind the jack shaft, plus that stored up in the compressed springs, is exerted upon the wheels to start the load. The springs again expand to the normal position between the lugs F and F', and only compress when receiving shocks due to obstructions or the unevenness of the road. The said springs thus relieve the running gear of shocks due to such causes. In starting a load, they, by compressing, furnish additional power as we have seen, and after the car has started they serve as shock absorbers.

It will be observed that the bearings of the wheel hubs on the axle spindles are entirely independent of the bearings of the drive gear. This arrangement, in connection with the springs, entirely relieves the drive mechanism from any twist or strain that the wheels may be subjected to. As a consequence, the pinions of the jack shafts, and the gears, are preserved in proper alinement.

Having described my invention, I claim:

In a motor vehicle running gear, the combination of a rear axle and wheel spindles, said wheel spindles being dropped below the plane of the axle, driving gears mounted upon roller bearings on said axle adjacent to the wheel spindles, said driving gears having pocket lugs extending laterally from the outer sides thereof, traction wheels having their hubs mounted on roller bearings on said spindles, the inner sides of said hubs having laterally extended pocket lugs matching those on the gears and providing a series of pockets around the peripheries of the inner portions of the wheel hubs, the adjacent edges of the upper portions of the pocket lugs being separated by suitable space to permit of a resilient action of the wheel spindles, a series of coil springs located within said pockets between shoulders on the pocket lugs of the gears and wheel hubs respectively, and a jack shaft parallel with the axle and geared to said gears.

In testimony whereof I affix my signature, in presence of two witnesses.

GILBERT S. GUNDERSEN.

Witnesses:
R. J. McCarty,
Matthew Siebler.